(12) United States Patent
Mayol Cuevas et al.

(10) Patent No.: US 11,736,753 B1
(45) Date of Patent: *Aug. 22, 2023

(54) VIDEO ENHANCEMENT SERVICE

(71) Applicant: Amazon Technologies, Inc., Seattle, WA (US)

(72) Inventors: Walterio Wolfgang Mayol Cuevas, Seattle, WA (US); Wasiq Bokhari, Bainbridge Island, WA (US); William Vass, Bainbridge Island, WA (US); Sean Love, Mercer Island, WA (US); Garish Sood, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/526,531

(22) Filed: Nov. 15, 2021

Related U.S. Application Data

(63) Continuation of application No. 16/746,579, filed on Jan. 17, 2020, now Pat. No. 11,206,438.

(51) Int. Cl.
*H04N 21/2662* (2011.01)
*G06N 20/00* (2019.01)
*H04N 21/2187* (2011.01)
*H04N 21/24* (2011.01)
*G06V 20/40* (2022.01)
(Continued)

(52) U.S. Cl.
CPC ......... *H04N 21/2662* (2013.01); *G06N 20/00* (2019.01); *G06V 20/41* (2022.01); *H04L 65/65* (2022.05); *H04L 65/75* (2022.05); *H04N 21/2187* (2013.01); *H04N 21/2402* (2013.01)

(58) Field of Classification Search
CPC ..... H04L 65/65; H04L 65/75; H04N 21/2662; H04N 21/2187; H04N 21/2402; G06N 20/00; G06V 20/41
See application file for complete search history.

(56) References Cited

U.S. PATENT DOCUMENTS 11,463,757 B2 * 10/2022 Shen ................ H04N 21/64322
2011/0299606 A1 12/2011 Chen et al.
(Continued)

FOREIGN PATENT DOCUMENTS

WO 2019/103929 A1 5/2019

OTHER PUBLICATIONS

International Search Report and Written Opinion, PCT App. No. PCT/US2021/013667, dated Apr. 28, 2021, 15 pages.
(Continued)

*Primary Examiner* — El Hadji M Sall
(74) *Attorney, Agent, or Firm* — Nicholson De Vos Webster & Elliott LLP

(57) ABSTRACT

Techniques for video enhancement using a service are described. In some examples, a video enhancement service is to receive, from a requesting device, a request to provide a video, the request including an indication that at least a proper subset of the video is to be enhanced using at least one machine learning model; select at least one machine learning model to be used to enhance at least the proper subset of the video; enhance at least the proper subset of the video using the selected at least one machine learning model; and output the video including the at least proper subset of the video that had been enhanced.

20 Claims, 10 Drawing Sheets

(51) Int. Cl.
*H04L 65/65* (2022.01)
*H04L 65/75* (2022.01)

(56) References Cited

U.S. PATENT DOCUMENTS

| | | | |
|---|---|---|---|
| 2017/0238055 A1* | 8/2017 | Chang | H04N 21/4662 |
| | | | 725/19 |
| 2017/0347061 A1 | 11/2017 | Wang et al. | |
| 2019/0205402 A1 | 7/2019 | Sernau et al. | |
| 2019/0379875 A1* | 12/2019 | Gopalakrishnan | H04N 13/161 |

OTHER PUBLICATIONS

Kumar et al., "Double Sarsa Based Machine Learning to Improve Quality of Video Streaming Over Http Through Wireless Networks", Conference: 2018 ITU Kaleidoscope: Machine Learning for a 5G Future (ITU K), Nov. 26, 2018, 8 pages.
Non-Final Office Action, U.S. Appl. No. 16/746,579, dated Nov. 24, 2020, 10 pages.
Notice of Allowance, U.S. Appl. No. 16/746,579, dated Aug. 16, 2021, 7 pages.

* cited by examiner

```
GET MEDIA FOR FRAGMENT LIST 601

POST /GETMEDIAFORFRAGMENTLIST HTTP/1.1
CONTENT-TYPE: APPLICATION/JSON
{
"FRAGMENTS": [ "ID OF FRAGMENT #S TO RETRIEVE" ]
"STREAMNAME": "NAME"
"AUTOENHANCE": "YES/NO"
"ENHANCEMODEL": "MODEL NAME"
 "BANDWIDTH": "FLOATINGPOINT"
 "DEVICECHAR": "STRING ARRAY"
 "ENHANCEQUALITY" : "FLOATINGPOINT ARRAY"
 "ENHANCHEMENTSPEED": "FLOATINGPOINT"
 "PERCEPTUALINDEX" : "FLOATINGPOINT"
 "PROVIDER": "PROVIDER NAME"}
```

```
GET MEDIA 611

POST /GETMEDIA HTTP/1.1
CONTENT-TYPE: APPLICATION/JSON
{
"STARTSELECTOR": {
    "AFTERFRAGMENTNUMBER": "STRING",
    "CONTINUATIONTOKEN": "STRING",
    "STARTSELECTORTYPE": "STRING",
    "STARTTIMESTAMP": NUMBER
  },
 "STREAMARN": "STRING",
 "STREAMNAME": "STRING"
 "AUTOENHANCE": "YES/NO"
 "ENHANCEMODEL": "MODEL NAME"
 "BANDWIDTH": "FLOATINGPOINT"
 "DEVICECHAR": "STRING ARRAY"
 "ENHANCEQUALITY" : "FLOATINGPOINT ARRAY"
 "ENHANCHEMENTSPEED": "FLOATINGPOINT"
 "PERCEPTUALINDEX" : "FLOATINGPOINT"
 "PROVIDER": "PROVIDER NAME"
}
```

*FIG. 6*

```
                    GET HLS STREAMING SESSION URL 701

POST /GETHLSSTREAMINGSESSIONURL HTTP/1.1
CONTENT-TYPE: APPLICATION/JSON
{
  "CONTAINERFORMAT": "STRING",
  "DISCONTINUITYMODE": "STRING",
  "DISPLAYFRAGMENTTIMESTAMP": "STRING",
  "EXPIRES": NUMBER,
  "HLSFRAGMENTSELECTOR": {
    "FRAGMENTSELECTORTYPE": "STRING",
    "TIMESTAMPRANGE": {
      "ENDTIMESTAMP": NUMBER,
      "STARTTIMESTAMP": NUMBER
    }
  },
  "MAXMEDIAPLAYLISTFRAGMENTRESULTS": NUMBER,
  "PLAYBACKMODE": "STRING",
  "STREAMARN": "STRING",
  "STREAMNAME": "STRING"
  "AUTOENHANCE": "YES/NO"
  "ENHANCEMODEL": "MODEL NAME"
  "BANDWIDTH": "FLOATINGPOINT"
  "DEVICECHAR": "STRING ARRAY"
  "ENHANCEQUALITY" : "FLOATINGPOINT ARRAY"
  "ENHANCHEMENTSPEED": "FLOATINGPOINT"
  "PERCEPTUALINDEX" : "FLOATINGPOINT"
  "PROVIDER": "PROVIDER NAME"
}
```

```
                   GET DASH STREAMING SESSION URL 711

POST /GETDASHSTREAMINGSESSIONURL HTTP/1.1
CONTENT-TYPE: APPLICATION/JSON

{
  "DASHFRAGMENTSELECTOR": {
    "FRAGMENTSELECTORTYPE": "STRING",
    "TIMESTAMPRANGE": {
      "ENDTIMESTAMP": NUMBER,
      "STARTTIMESTAMP": NUMBER
    }
  },
  "DISPLAYFRAGMENTNUMBER": "STRING",
  "DISPLAYFRAGMENTTIMESTAMP": "STRING",
  "EXPIRES": NUMBER,
  "MAXMANIFESTFRAGMENTRESULTS": NUMBER,
  "PLAYBACKMODE": "STRING",
  "STREAMARN": "STRING",
  "STREAMNAME": "STRING"
  "AUTOENHANCE": "YES/NO"
  "ENHANCEMODEL": "MODEL NAME"
  "BANDWIDTH": "FLOATINGPOINT"
  "DEVICECHAR": "STRING ARRAY"
  "ENHANCEQUALITY" : "FLOATINGPOINT ARRAY"
  "ENHANCHEMENTSPEED": "FLOATINGPOINT"
  "PERCEPTUALINDEX" : "FLOATINGPOINT"
  "PROVIDER": "PROVIDER NAME"
}
```

*FIG. 7*

VIDEO ENHANCEMENT SERVICE

CROSS-REFERENCE TO RELATED APPLICATION

This application claims benefit under 35 U.S.C. § 120 as a continuation of U.S. patent application Ser. No. 16/746,579, filed on Jan. 17, 2020, the entire contents of which are hereby incorporated by reference as if fully set forth herein.

BACKGROUND

There are several video services that allow one to stream live video from devices to the cloud and from the cloud to an edge device, or build applications for real-time video processing or batch-oriented video analytics.

BRIEF DESCRIPTION OF DRAWINGS

Various embodiments in accordance with the present disclosure will be described with reference to the drawings, in which:

FIG. 6 illustrates exemplary embodiments of two APIs that may be used to retrieve enhanced video content.

FIG. 7 illustrates exemplary embodiments of two APIs that may be used to retrieve enhanced video content.

DETAILED DESCRIPTION

The present disclosure relates to methods, apparatus, systems, and non-transitory computer-readable storage media for enhancing a video using a video service. According to some embodiments, a request is received to have a video enhanced using one or more machine learning models. The request may be in the form of an application programming interface (API) call for media, media fragments, a DASH stream, an HLS stream, etc.

Typical API calls for media, media fragments, a DASH stream, an HLS stream, etc. merely request that specified video content be served as it was stored. In many instances this video is of lower quality because of network deficiencies, camera deficiencies, and/or storage space constraints. Detailed herein embodiments that allow for an API for a video to also request that the lower quality video be enhanced.

Figure 1:
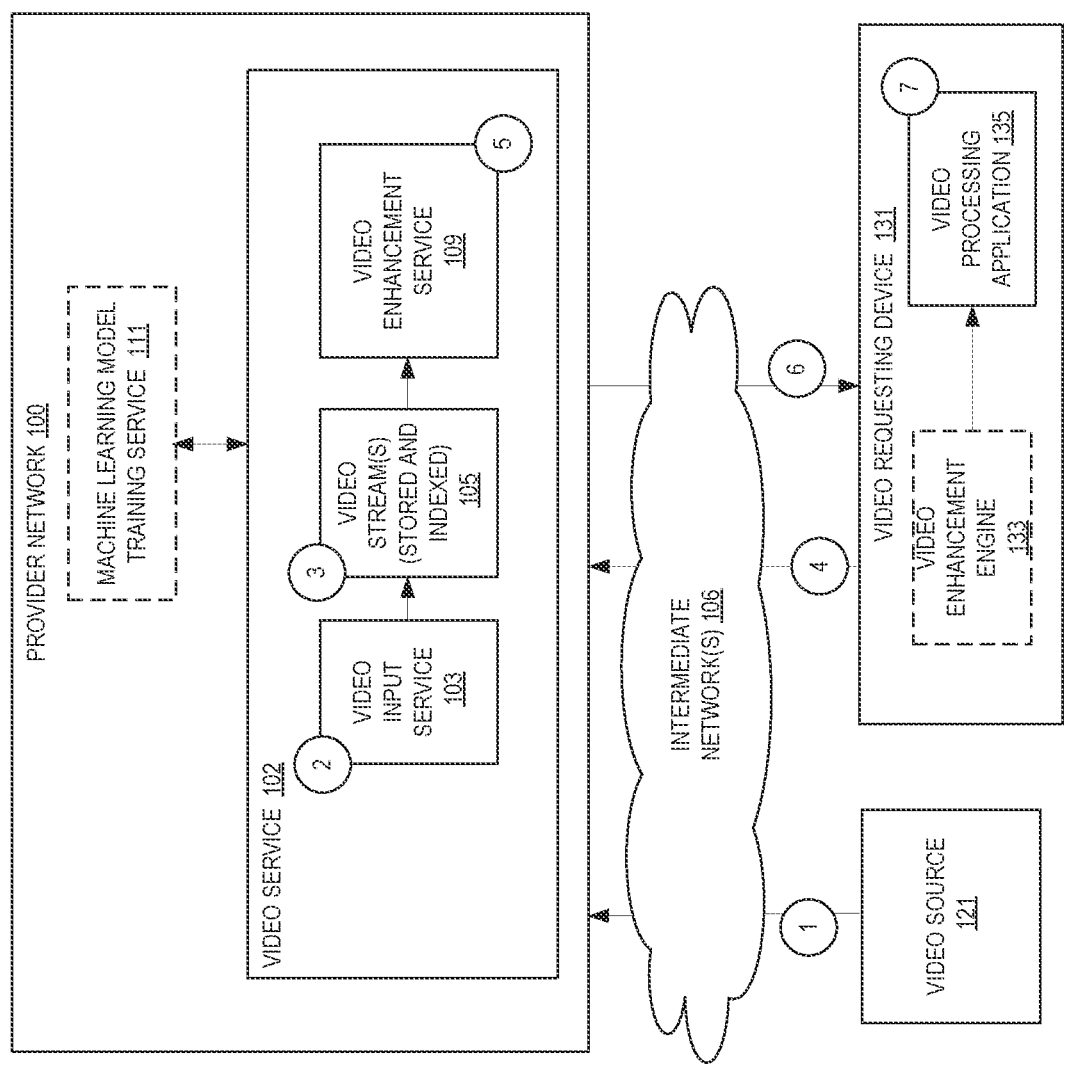
FIG. 1 illustrates embodiments of a video service that allows for selective enhancement of streaming or stored videos.

FIG. 1 illustrates embodiments of a video service that allows for selective enhancement of streaming or stored videos. In particular, the video service 102 allows for the enhancement of a video provided by a video source 121 using one or more machine learning models that are a part of a video enhancement service 109.

As shown, the video source 121 provides video to a video service 102. The video source 121 may be any video-generating device, such as a security camera, a body-worn camera, a smartphone camera, a dashboard camera, video camera, video file, etc. A video source 121 can generate one or more video streams 105. In some embodiments, the video from the video source 121 is sent to the video input service 103 as a stream of media fragments and metadata describing the stream. In other embodiments, the video from the video source 121 is a video file (e.g., a MPEG-4 video file).

The video input service 103 is an ingestion and storage service which securely ingests, processes, stores, and time-based indexes video into video streams 105. The video input service 103 provides application programming interfaces that allow for the access and retrieval of indexed video fragments. A video stream 105 may have multiple consumers.

The video enhancement service 109 enhances at least a proper subset of a video stream 105 using one or more machine learning (ML) models. In particular, an API call to the video service 102 indicates what video stream 105 (or subset thereof) to enhance. The video enhancement service 109 may determine which ML model to use based on one or more factors, including, but not limited to: bandwidth of the connect to the video requesting device 121, the requesting (edge) device's characteristics, the scene to be enhanced, the desired quality, and/or information about the camera that took the video, etc.

Additionally, in some embodiments, feedback from the video requesting device 131 may be used to call a ML model training service 111 to tune the models used by the video enhancement service 109.

As shown, the video service 102 and machine learning model training service 111 are part of a provider network 100 (or, "cloud" provider network) that provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 106 (e.g., the internet) via one or more interface(s), such as through use of application programming interface (API) calls, via a console implemented as a website or application, etc. The interface(s) may be part of, or serve as a front-end to, a control plane of the provider network 100 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

The video requesting device 131 includes a video processing application 135 (e.g., a multimedia player) to provide a display of the enhanced video generated by the video enhancement service 109 (and, of course, video from the video streams 105 that has not been enhanced). Additionally, in some embodiments, a video enhancement engine 133 of the video requesting device 131 is used to provide further enhancement or cooperatively enhance the video output from the video service 102. For example, the video enhancement engine 133 may be used to upsample the video. Other examples of split computation include, but are not limited to: using different scaling factors (e.g., downsampling at the source (providing lower quality video and enhancing using the video enhancement service), providing transformed images to the video service 102, etc.

The circles with numbers inside indicate an exemplary flow. At circle 1, the video source 121 provides video data to the video service 102. For example, video fragments are provided. In some embodiments, an API "put" call is used.

The video service input service 103 generates one or more video streams at circle 2 an stores and indexes them at circle 3. Details on this generation, etc. are explained in more detail below.

At circle 4, the video requesting device 131 requests a video stream and that at least a proper subset of the video stream be enhanced using one or more ML models. Several examples of API calls for this request are detailed with respect to FIGS. 6-7.

The video enhancement service 109 enhances the video per the request at circle 5 and returns the enhanced video at circle 6. At circle 7, the video processing application 135 of the video requesting device 131 displays the enhanced video.

Figure 2:
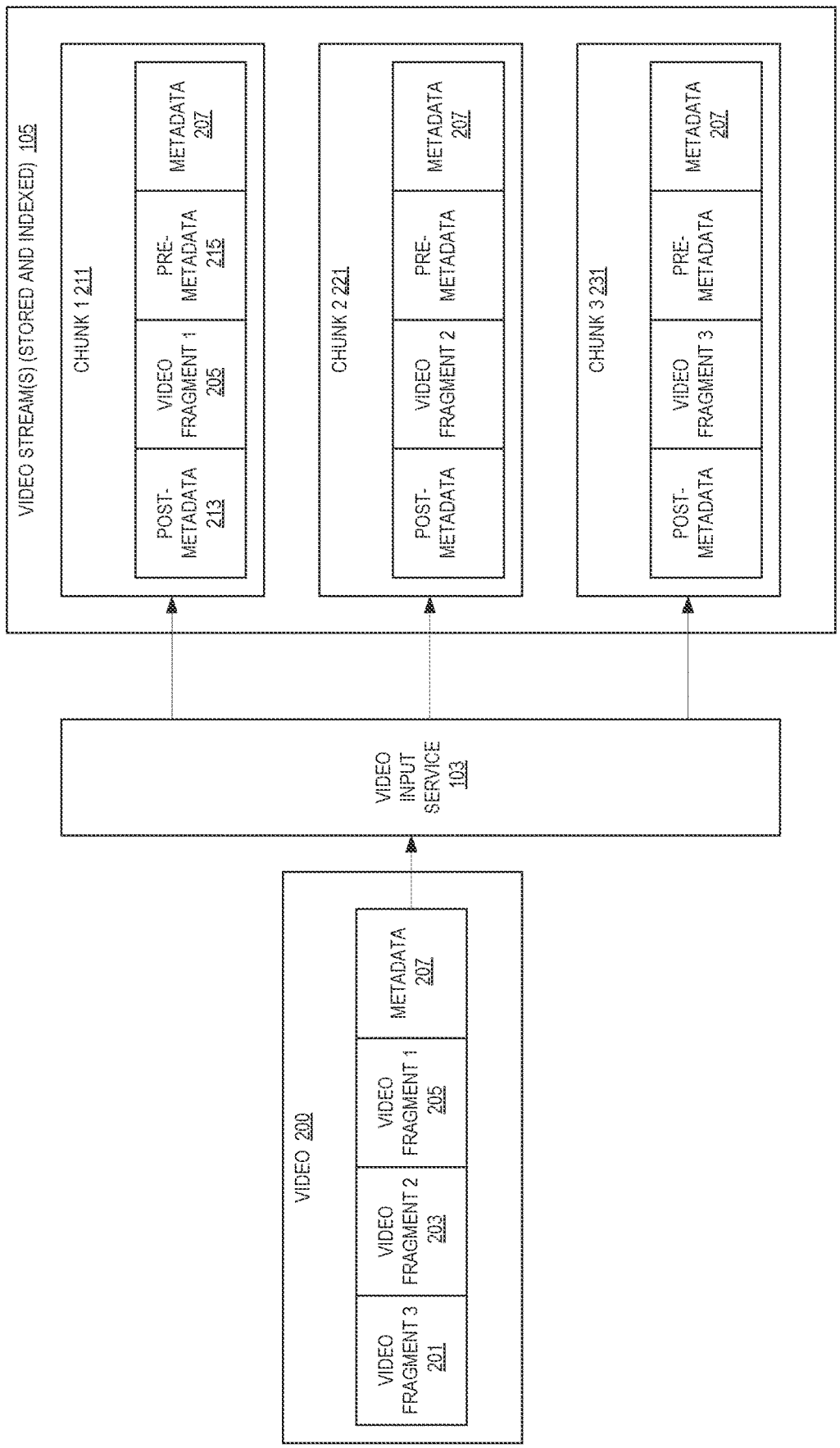
FIG. 2 illustrates embodiments of a video input service processing an input video.

FIG. 2 illustrates embodiments of a video input service processing an input video. As shown, a video 200 comprises a plurality of video fragments 201-205 and metadata 207 (e.g., time stamp information) describing the video 200. A video fragment is a self-contained sequence of frames. The frames belonging to a fragment should have no dependency on any frames from other fragments. As fragments arrive, the video input service 103 assigns each fragment a unique fragment number, assigns or generates a time stamp for each fragment (producer and server side), and stores this information (timestamp and fragment number) as metadata.

The video input service 103 stores the video data as a video stream 105 of stored and indexed chunks. Each chunk (shown in this example as chunk 1 211, chunk 2 221, and chunk 3 231) consists of the actual media fragment from the video 200, a copy of media metadata sent by the producer 207, and the specific metadata for that chunk such as the fragment number, and server-side and producer-side timestamps as pre- or post-metadata 213 and 215.

When a consumer requests media data through an API operation, the video input service 103 returns a stream of chunks, starting with the fragment number that is specified in the request.

Figure 3:
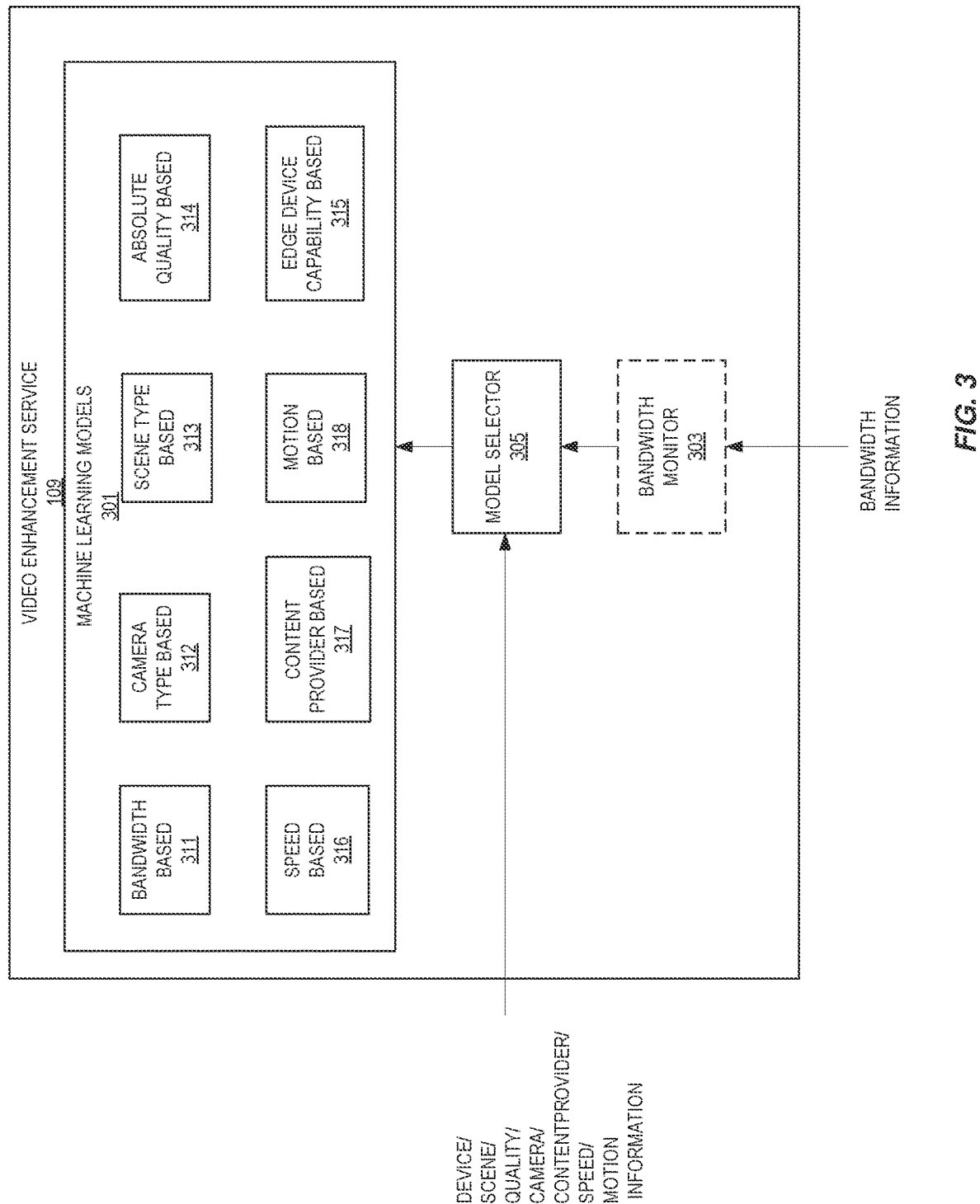
FIG. 3 illustrates embodiments of the video enhancement service.

FIG. 3 illustrates embodiments of the video enhancement service 109. As shown, the video enhancement service 109 utilizes one or more machine learning models 301. In this illustration, several different models are shown in a non-limiting sense. A bandwidth-based model 311 enhances video content based upon the downstream bandwidth available. Note that there may be several different bandwidth-based models to select from (e.g., a first model for a first bandwidth, a second model for a second bandwidth, etc.) or the available bandwidth may be used as an input parameter of a model which changes the quality of the output. Additionally, the bandwidth-based model 311 may also take in a desired quality as a part of its input.

A camera type-based model 312 enhances video content based on the characteristics of the camera that took the video. For example, characteristics such as the focal length, image sensor format, etc. are used by the camera type-based model 312 in its function.

A scene type-based model 313 enhances the video based on the scene of a fragment. In some embodiments, the scene is identified prior to the request (e.g., metadata for a fragment includes an indication of the scene type such as outside, underwater, night, sunny, inside, etc.). In some embodiments, the model selector 305 includes a detection mechanism (e.g., another ML model) to classify a scene.

An absolute quality-based model 314 enhances a video based on a provided quality request regardless of the bandwidth, scene, etc.

An edge device capability-based model 315 enhances video, but also considers what the edge device can do. For example, if the screen has a resolution of 1080P and a refresh rate of 60 Hz, the edge device capability-based model 315 will not generate a 4K picture at a refresh rate of 120 Hz.

A speed-based model 316 enhances video at a faster rate and, as such, sacrifices some quality.

A content provider-based model 317 enhances video in a manner dictated by the content provider. For example, a particular internet service provider (ISP) may have its own model to use to deliver content in a manner that it feels is best suited for its customers over its network and/or consistent with the service a particular customer has requested.

A motion-based model 318 enhances video where the camera source is moving such as a camera attached to a person or vehicle.

In some embodiments, at least some of the models, such as the camera type-based model 312, scene type-based model 313, edge device capability-based model 315, speed-based model 316, and motion-based model 318 also take in a desired quality, edge device capability, and/or bandwidth available as a part of their inputs.

Information regarding the requesting device, scene, quality desired, content provider, speed, motion, and/or the camera is received by the model selector 305 which determines what model or models to use. For example, when no information about the camera is received, but scene information is received, the model selector 305 will select at least the scene type-based model 313. Note that this information may be found in the metadata for the video. The model selector 305 also receives bandwidth information. In some embodiments, a bandwidth monitor 303 tracks the bandwidth of the connection and/or receives information from the requesting device about its load (e.g., the ability to process the video).

Figure 4:
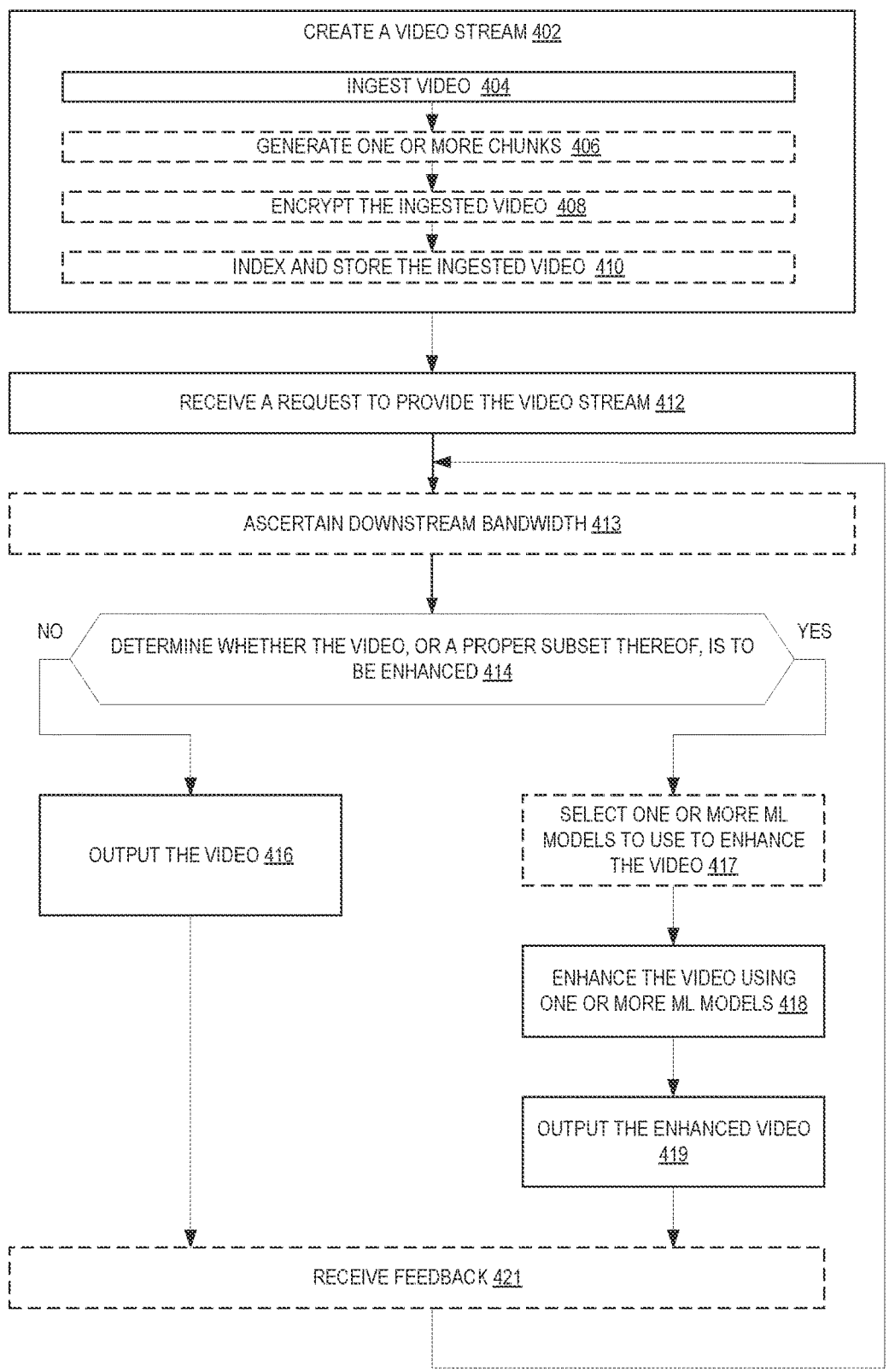
FIG. 4 is a flow diagram illustrating operations of a method for video enhancement using one or more services according to some embodiments.

FIG. 4 is a flow diagram illustrating operations of a method for video enhancement using one or more services according to some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by aspects of the video service 102 of the other figures.

In some embodiments, a video stream for a video is created at 402. Examples of such creation have been detailed above and may include generating chunks, etc. The creation of a video stream may encompass one or more actions. At 404, the video is ingested.

Once the video is ingested, in some embodiments, the video is chunked at 406. As noted, a chunk may include a video fragment and metadata describing the video and/or video fragment. The metadata may include information about the camera that took the video, an indication of the scene type, etc. In some embodiments, a ML model is applied to determine the scene type.

In some embodiments, the video (or chunks thereof) is encrypted at 408. This encryption helps to ensure that the video can only be seen by those with proper access.

At 410, the video (encrypted, chunked, or not) is indexed and stored in some embodiments. In particular, the video is stored in a manner that makes it accessible for later retrieval. Note that this storage may be a temporary buffer for a live stream.

At some point, a request to provide the (indexed) video is received at 412. For example, an API request such as those detailed herein. The request includes one or more of: an indication of the video to retrieve (or a proper subset thereof), the manner in which the video is to be provided (e.g., media fragments, HLS, DASH, etc.), an indication of desired quality, an indication of downstream bandwidth (e.g., the bandwidth between the provider network and the requesting device), information about the camera that took the video, information about the scene, information about the requesting device (e.g., processing power, memory available, screen resolution and refresh rate, etc.), and/or a ML model selection.

In some embodiments, the downstream bandwidth is ascertained at 413. If the request did not provide this information, this may be accomplished by measuring the difference between time stamps as received by the downstream device.

At 414, a determination of whether the video, or a proper subset thereof, is to be enhanced is made. This determination may be made by looking at the request itself (did it ask for it), whether it is opportunistically a good opportunity to enhance (e.g., there is a lot of bandwidth and the video was originally of lower quality), and/or whether the downstream device can handle the enhancement (e.g., don't enhance if the quality of video is beyond what the downstream device can handle) or the bandwidth supports the enhancement. Note that this determination may include deciding to enhance the video, but at a lower quality than requested based on one or more of the above factors.

Figure 5:
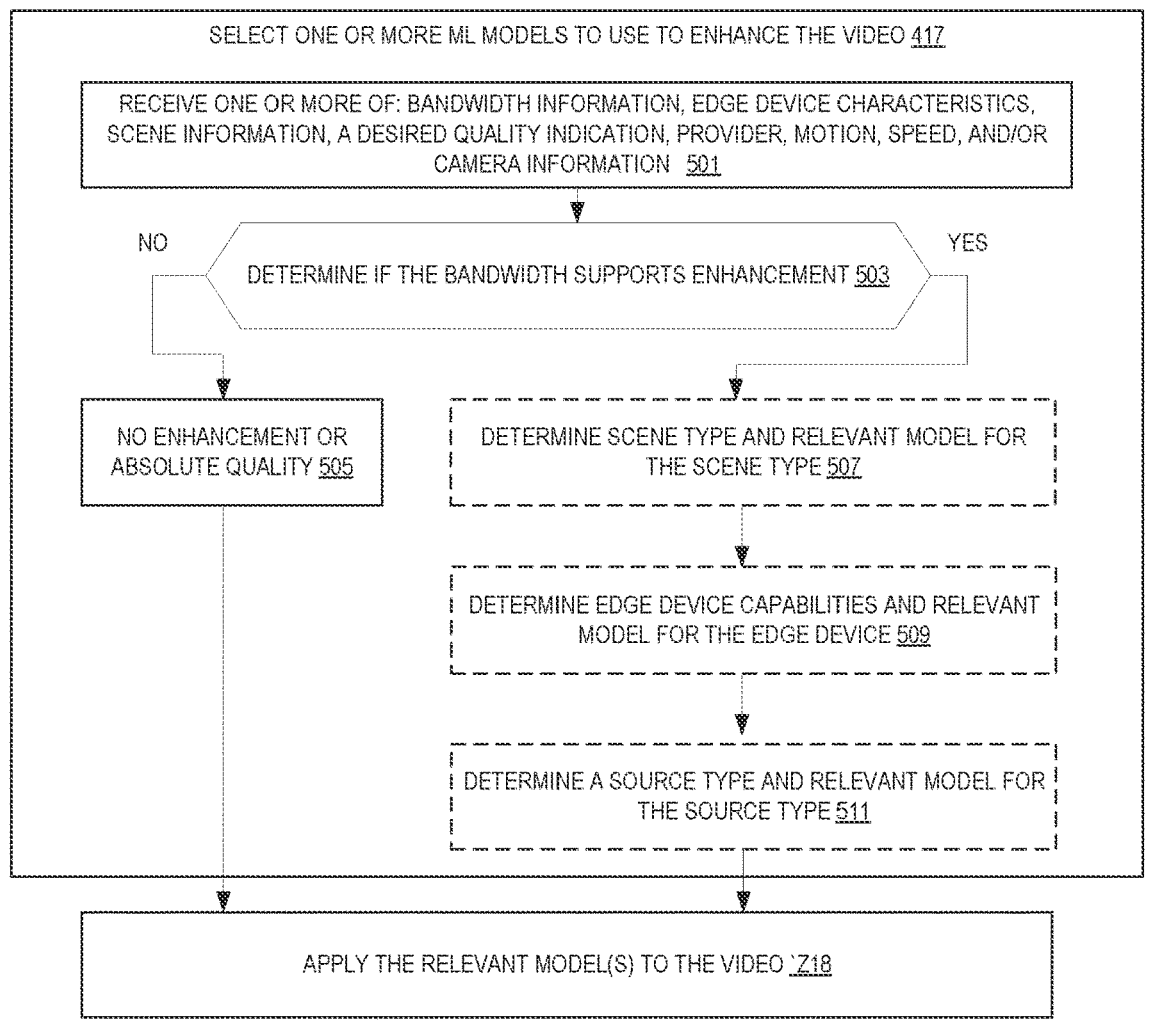
FIG. 5 is a flow diagram illustrating operations of a method for selecting a ML model for video enhancement according to some embodiments.

When there is no enhancement to be done, the video stream is output at 416. When there is enhancement to be performed, in some embodiments, a selection of one or more ML models to use to enhance the video is made 417. A more detailed exemplary flow for this selection is illustrated in FIG. 5. Note that when the request includes a ML model selection, this serves as the selection.

The video stream is enhanced using one or more selected ML models at 418. In particular, video fragments are input into one or more ML models to generate enhanced video.

The enhanced video is output at 419. This output is as requested (e.g., as HLS, DASH, etc.).

In some embodiments, feedback is received at 421. This feedback may be in the form of user feedback (e.g., the quality is not good, etc.) or information regarding bandwidth such that the ML model usage may be tweaked for subsequent video fragments (e.g., decrease quality if the bandwidth is too low and increase quality or try a different model if the enhanced video is not acceptable to the end user).

FIG. 5 is a flow diagram illustrating operations of a method for selecting a ML model for video enhancement according to some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 400 are performed by the model selector 305 of the other figures.

At 501, one or more of: bandwidth information, edge device characteristics, scene information, a desired quality indication, content provider information, motion information, speed of enhancement information, and/or camera information is/are received. Some of this may be a part of the request itself, the metadata of the video, etc.

A determination of if the bandwidth supports the desired enhancement (or enhancement at all) is made at 503. The output size for any given model for an input file is generally known. As such, comparing that estimated output size to what can be supported by the bandwidth allows for determining of if the desired enhancement is practical.

When the bandwidth does not support the desired enhancement, then typically no enhancement is performed at 505. However, in some instances, an absolute quality of enhancement is utilized ignoring the bandwidth altogether.

A determination of a scene type and relevant model for the scene type is made at 507 in some embodiments. The scene type may have been provided in the metadata for a given fragment, or be determined using a ML scene detection model.

In some embodiments, a determination of the receiving edge device's capabilities and relevant model for the edge device is made at 509. The determination may be made by looking up characteristics of the edge device (e.g., a particular model of phone), querying the edge device, querying the user and getting a response, or by receiving this information as a part of the request.

A determination of a source type and relevant model for the source type in some embodiments is made at 511. For example, what type of camera was used, etc. Typically, this is determined by looking up information about the camera or having that information provided as a part of the metadata for the video or fragment.

Note that the selection of the model(s) may be made per single fragment, per multiple fragments, or for an entire video.

At 513, the relevant model(s) are applied to the video (fragments) (which is 418).

FIG. 6 illustrates exemplary embodiments of two APIs that may be used to retrieve enhanced video content. In particular, the video service 102 receives this request to direct the video input service 103 to provide a video stream to the video enhancement service 109.

A get media API call (request) 611 may be used to retrieve media content from a video stream. This request identifies the stream name and the starting chunk. The video service 102 will return a stream of chunks in order by fragment number. Additional tags such as a continuation token, time behind, fragment number, timestamp of the server, and producer timestamp may be provided with each chunk.

As shown, the body of the request of the exemplary includes one or more of: a StartSelector which identifies the starting chunk to get, a StartSelector which identifies the resource number of the video, a StreamName which identifies the video stream by name, an AutoEnhance indication which indicates if the requester would like enhancement, an EnhanceModel indication which indicates a particular model to use for the enhancement, a bandwidth indication, an array of device characteristics, speed of enhancing information, a perceptual index value indicting how much details of the video can be altered, a provider name, and/or an indication of the quality of the enhancement (e.g., resolution, refresh rate, etc.).

A get media fragment list API call (request) 601 may be used to retrieve media content from a video stream. This request identifies the stream name and fragment IDs. The video service 102 will return a stream of chunks in order by fragment number. Additional tags such as a continuation token, time behind, fragment number, timestamp of the server, and producer timestamp may be provided with each chunk.

As shown, the body of the request of the exemplary includes one or more of: a Fragments list which identifies the fragments to get, a StreamName which identifies the video stream by name, an AutoEnhance indication which indicates if the requester would like enhancement, an EnhanceModel indication which indicates a particular model to use for the enhancement, a bandwidth indication, an array of device characteristics, speed of enhancing information, a perceptual index value indicting how much details of the video can be altered, a provider name, and/or an indication of the quality of the enhancement (e.g., resolution, refresh rate, etc.).

FIG. 7 illustrates exemplary embodiments of two APIs that may be used to retrieve enhanced video content. In particular, the video service 102 receives this request to direct the video input service 103 to provide a video stream to the video enhancement service 109.

A get DASH streaming session URL API call (request) 711 may be used to retrieve media content from a video stream. This request causes the video service 102 to retrieve an MPEG Dynamic Adaptive Streaming over HTTP (Hypertext Transport Protocol) (DASH) URL for the stream. This URL can then be opened in a media player to view the stream contents. Note that one of the stream resource name or stream name should be specified.

As shown, the body of the request of the exemplary includes one or more of: a DASHFragmentSelector which is the time range of the requested fragment and the source of the timestamps; a DisplayFragmentNumber which identifies fragments in the manifest file based on their sequence number in the session; a DisplayFragmentTimestamp which may be used to adjust a media timeline; Expires which is the time in seconds until the requested session expires; a MaxManifestFragmentResults which is the maximum number of fragments that are returned in the MPEG-DASH manifest; a PlaybackMode which indicates whether to retrieve live, live replay, or archived, on-demand data; a stream resource name indication; a stream name; an AutoEnhance indication which indicates if the requester would like enhancement; an EnhanceModel indication which indicates a particular model to use for the enhancement; a bandwidth indication; an array of device characteristics; speed of enhancing information; a perceptual index value indicting how much details of the video can be altered; a provider name; and/or an indication of the quality of the enhancement (e.g., resolution, refresh rate, etc.).

A get HLS streaming session URL API call (request) 701 may be used to retrieve media content from a video stream. This request causes the video service 102 to retrieve an HTTP Live Streaming (HLS) URL for the stream. This URL can then be opened in a media player to view the stream contents. Note that one of the stream resource name or stream name should be specified.

As shown, the body of the request of the exemplary includes one or more of: a ContainerFormat which specifies which format should be used for packaging the media; a DiscontinuityMode which specifies when flags marking discontinuities between fragments are added to the media playlists; a DisplayFragmentTimestamp which may be used to adjust a media timeline; Expires which is the time in seconds until the requested session expires; a HLSFragmentSelector which provides time range of the requested fragment and the source of the timestamps; MaxMediaPlaylistFragmentResults which is the maximum number of fragments that are returned in the HLS media playlists; a PlaybackMode which indicates whether to retrieve live, live replay, or archived, on-demand data; a stream resource name indication; a stream name; an AutoEnhance indication which indicates if the requester would like enhancement; an EnhanceModel indication which indicates a particular model to use for the enhancement; a bandwidth indication; an array of device characteristics; speed of enhancing information; a perceptual index value indicting how much details of the video can be altered; a provider name; and/or an indication of the quality of the enhancement (e.g., resolution, refresh rate, etc.).

Figure 8:
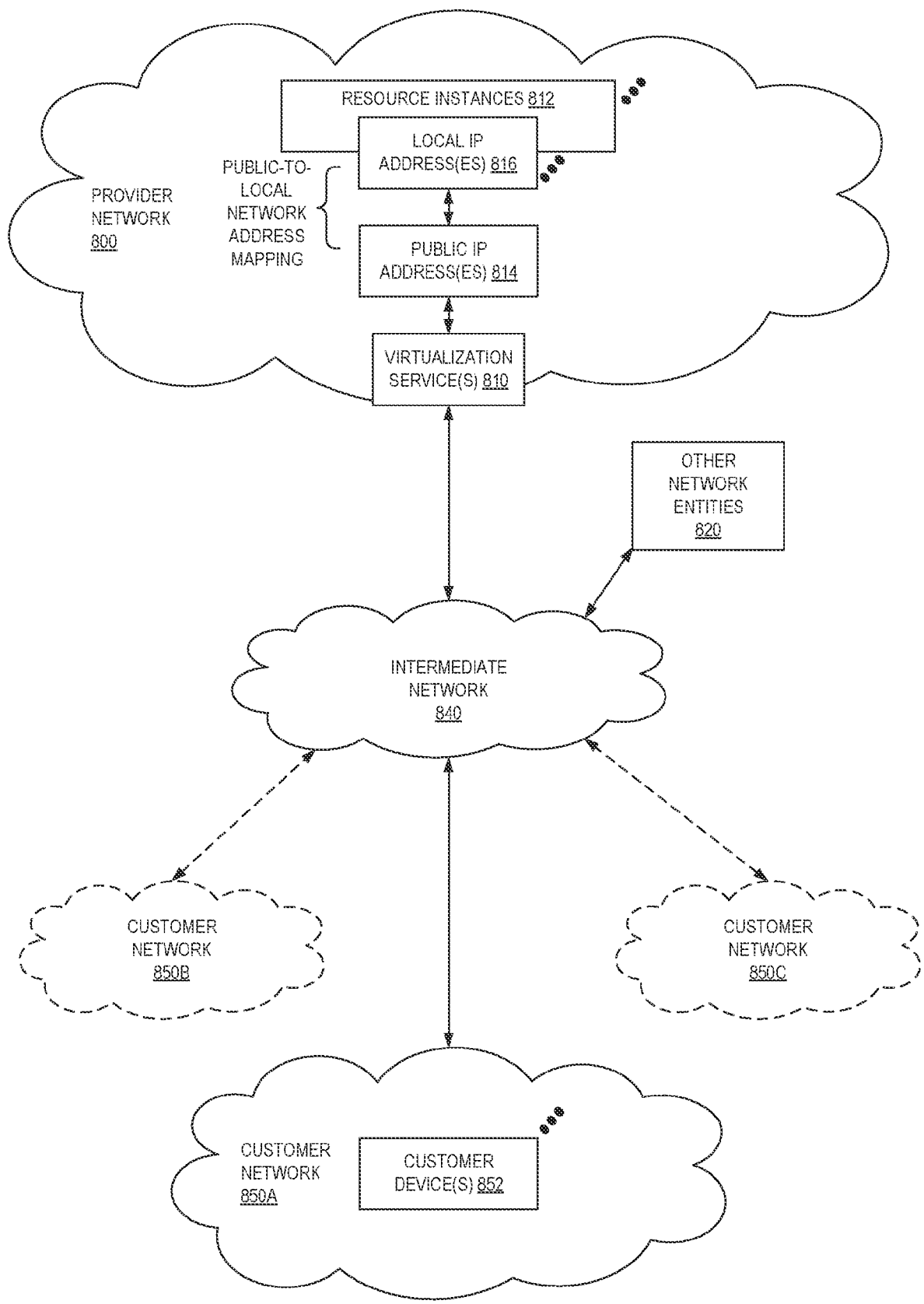
FIG. 8 illustrates an example provider network environment according to some embodiments.

FIG. 8 illustrates an example provider network (or "service provider system") environment according to some embodiments. A provider network 800 may provide resource virtualization to customers via one or more virtualization services 810 that allow customers to purchase, rent, or otherwise obtain instances 812 of virtualized resources, including but not limited to computation and storage resources, implemented on devices within the provider network or networks in one or more data centers. Local Internet Protocol (IP) addresses 816 may be associated with the resource instances 812; the local IP addresses are the internal network addresses of the resource instances 812 on the provider network 800. In some embodiments, the provider network 800 may also provide public IP addresses 814 and/or public IP address ranges (e.g., Internet Protocol version 4 (IPv4) or Internet Protocol version 6 (IPv6) addresses) that customers may obtain from the provider 800.

Conventionally, the provider network 800, via the virtualization services 810, may allow a customer of the service provider (e.g., a customer that operates one or more client networks 850A-850C including one or more customer device(s) 852) to dynamically associate at least some public IP addresses 814 assigned or allocated to the customer with particular resource instances 812 assigned to the customer. The provider network 800 may also allow the customer to remap a public IP address 814, previously mapped to one virtualized computing resource instance 812 allocated to the customer, to another virtualized computing resource instance 812 that is also allocated to the customer. Using the virtualized computing resource instances 812 and public IP addresses 814 provided by the service provider, a customer of the service provider such as the operator of customer network(s) 850A-850C may, for example, implement customer-specific applications and present the customer's applications on an intermediate network 840, such as the Internet. Other network entities 820 on the intermediate network 840 may then generate traffic to a destination public IP address 814 published by the customer network(s) 850A-850C; the traffic is routed to the service provider data center, and at the data center is routed, via a network substrate, to the local IP address 816 of the virtualized computing resource instance 812 currently mapped to the destination public IP address 814. Similarly, response traffic from the virtualized computing resource instance 812 may be routed via the network substrate back onto the intermediate network 840 to the source entity 820.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 800; a customer may then assign their allocated public IP addresses to particular resource instances allocated to the customer. These public IP addresses may be referred to as customer public IP addresses, or simply customer IP addresses. Instead of being assigned by the provider network 800 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 9:
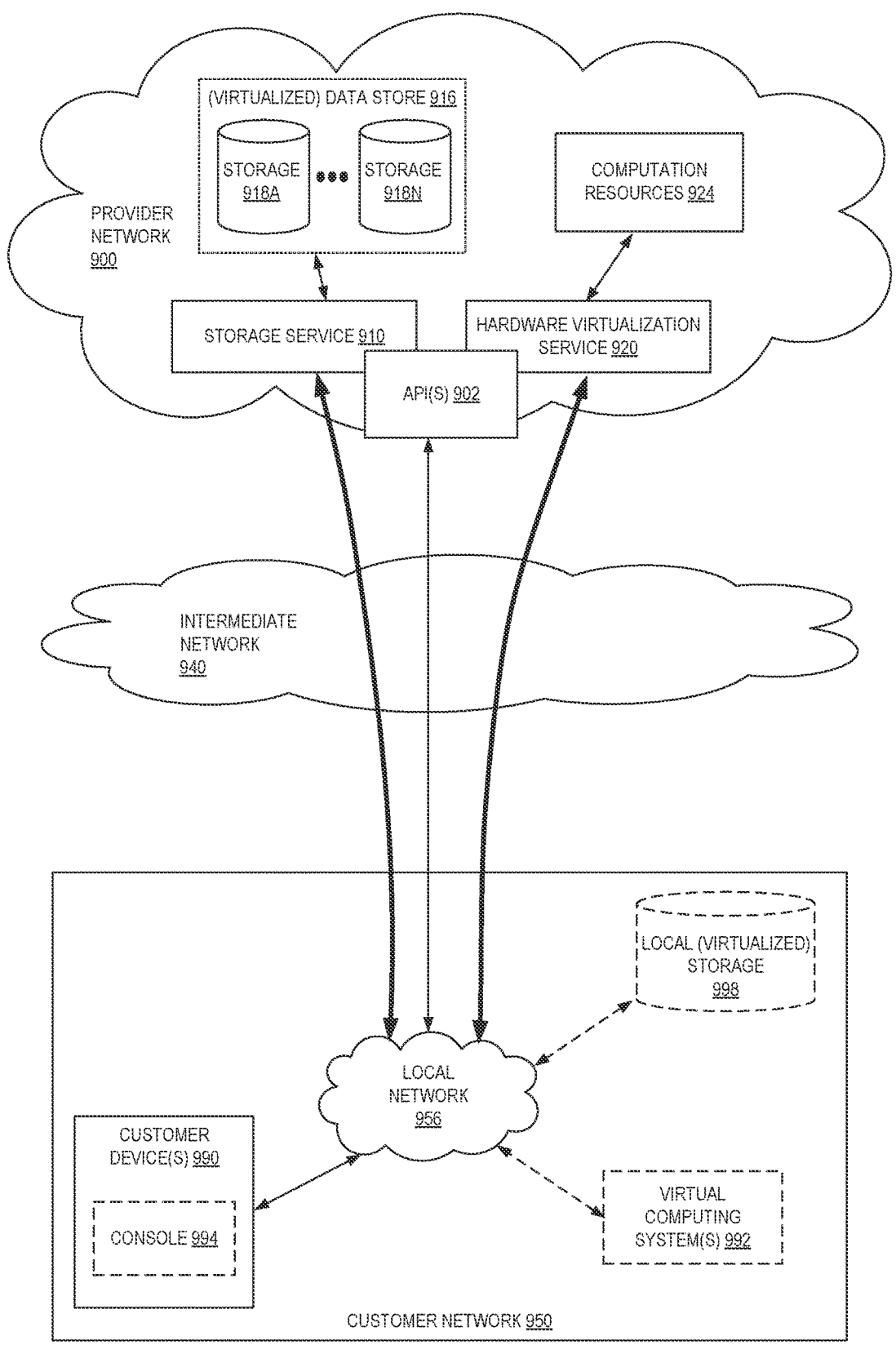
FIG. 9 is a block diagram of an example provider network that provides a storage service and a hardware virtualization service to customers according to some embodiments.

FIG. 9 is a block diagram of an example provider network that provides a storage service and a hardware virtualization service to customers, according to some embodiments. Hardware virtualization service 920 provides multiple computation resources 924 (e.g., VMs) to customers. The computation resources 924 may, for example, be rented or leased to customers of the provider network 900 (e.g., to a customer that implements customer network 950). Each computation resource 924 may be provided with one or more local IP addresses. Provider network 900 may be configured to route packets from the local IP addresses of the computation resources 924 to public Internet destinations, and from public Internet sources to the local IP addresses of computation resources 924.

Provider network 900 may provide a customer network 950, for example coupled to intermediate network 940 via local network 956, the ability to implement virtual computing systems 992 via hardware virtualization service 920 coupled to intermediate network 940 and to provider network 900. In some embodiments, hardware virtualization service 920 may provide one or more APIs 902, for example a web services interface, via which a customer network 950 may access functionality provided by the hardware virtualization service 920, for example via a console 994 (e.g., a web-based application, standalone application, mobile application, etc.). In some embodiments, at the provider network 900, each virtual computing system 992 at customer network 950 may correspond to a computation resource 924 that is leased, rented, or otherwise provided to customer network 950.

From an instance of a virtual computing system 992 and/or another customer device 990 (e.g., via console 994), the customer may access the functionality of storage service 910, for example via one or more APIs 902, to access data from and store data to storage resources 918A-918N of a virtual data store 916 (e.g., a folder or "bucket", a virtualized volume, a database, etc.) provided by the provider network 900. In some embodiments, a virtualized data store gateway (not shown) may be provided at the customer network 950 that may locally cache at least some data, for example frequently-accessed or critical data, and that may communicate with storage service 910 via one or more communications channels to upload new or modified data from a local cache so that the primary store of data (virtualized data store 916) is maintained. In some embodiments, a user, via a virtual computing system 992 and/or on another customer device 990, may mount and access virtual data store 916 volumes via storage service 910 acting as a storage virtualization service, and these volumes may appear to the user as local (virtualized) storage 998.

While not shown in FIG. 9, the virtualization service(s) may also be accessed from resource instances within the provider network 900 via API(s) 902. For example, a customer, appliance service provider, or other entity may access a virtualization service from within a respective virtual network on the provider network 900 via an API 902 to request allocation of one or more resource instances within the virtual network or within another virtual network.

Figure 10:
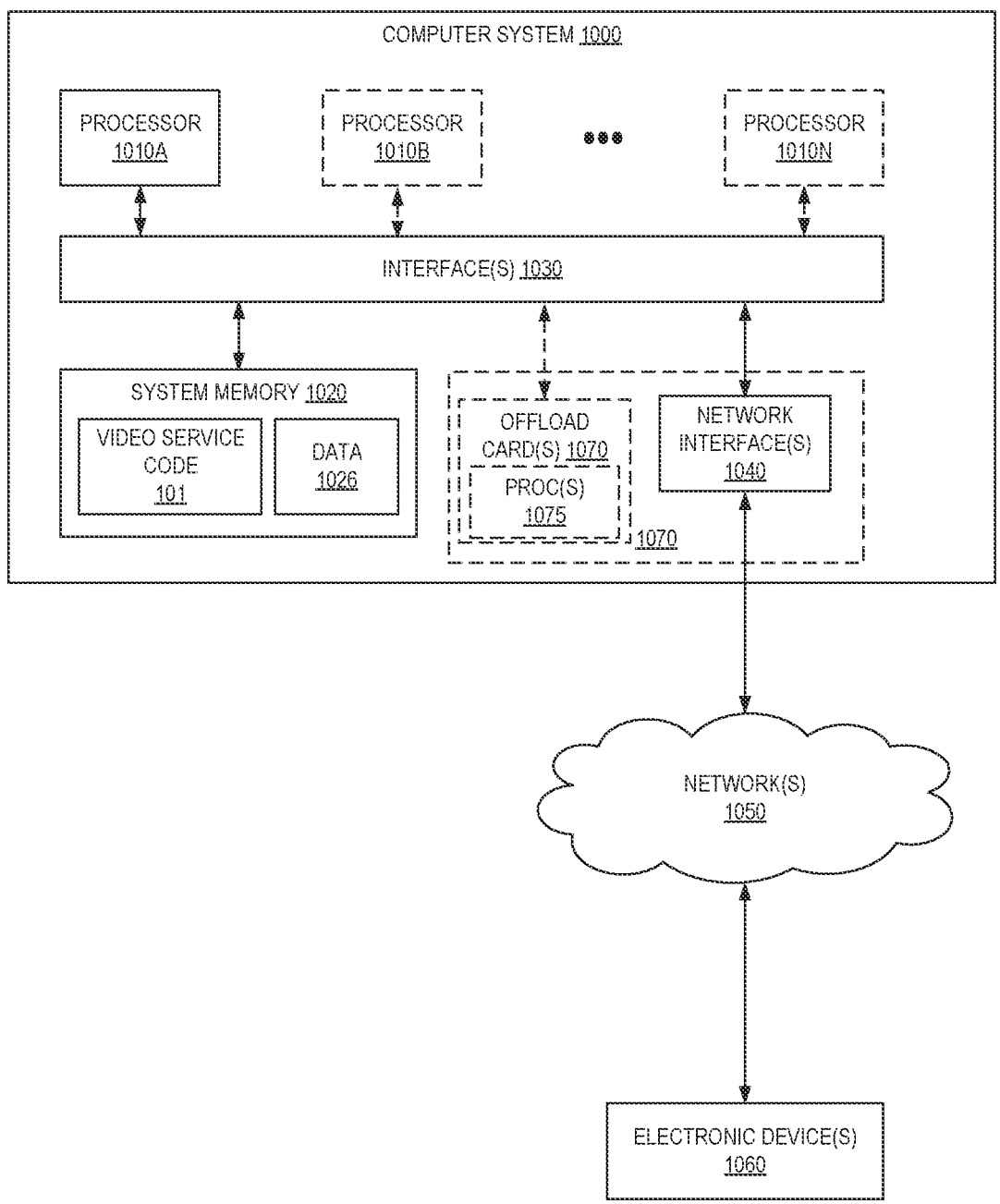
FIG. 10 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 1000 illustrated in FIG. 10. In the illustrated embodiment, computer system 1000 includes one or more processors 1010 coupled to a system memory 1020 via an input/output (I/O) interface 1030. Computer system 1000 further includes a network interface 1040 coupled to I/O interface 1030. While FIG. 10 shows computer system 1000 as a single computing device, in various embodiments a computer system 1000 may include one computing device or any number of computing devices configured to work together as a single computer system 1000.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1010 may commonly, but not necessarily, implement the same ISA.

System memory 1020 may store instructions and data accessible by processor(s) 1010. In various embodiments, system memory 1020 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1020 as video service code 102 and data 1026.

In one embodiment, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices 1060 attached to a network or networks 1050, such as other computer systems or devices as illustrated in FIG. 1, for example. In various embodiments, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1000 includes one or more offload cards 1070 (including one or more processors 1075, and possibly including the one or more network interfaces 1040) that are connected using an I/O interface 1030 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1000 may act as a host electronic device (e.g., operating as part of a hardware virtualization service) that hosts compute instances, and the one or more offload cards 1070 execute a virtualization manager that can manage compute instances that execute on the host electronic device. As an example, in some embodiments the offload card(s) 1070 can perform compute instance management operations such as pausing and/or un-pausing compute instances, launching and/or terminating compute instances, performing memory transfer/copying operations, etc. These management operations may, in some embodiments, be performed by the offload card(s) 1070 in coordination with a hypervisor (e.g., upon a request from a hypervisor) that is executed by the other processors 1010A-1010N of the computer system 1000. However, in some embodiments the virtualization manager implemented by the offload card(s) 1070 can accommodate requests from other entities (e.g., from compute instances themselves), and may not coordinate with (or service) any separate hypervisor.

In some embodiments, system memory 1020 may be one embodiment of a computer-accessible medium configured to store program instructions and data as described above. However, in other embodiments, program instructions and/ or data may be received, sent or stored upon different types of computer-accessible media. Generally speaking, a computer-accessible medium may include non-transitory storage media or memory media such as magnetic or optical media, e.g., disk or DVD/CD coupled to computer system 1000 via I/O interface 1030. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
receiving, from a requesting device, at a video enhancement service in a provider network, a request to provide a video, the request including an indication that at least a proper subset of the video is to be enhanced using at least one machine learning model;
automatically selecting, by the video enhancement service, at least one machine learning (ML) model to be used to enhance the proper subset of the video based on at least one factor;
enhancing, by the video enhancement service, at least the proper subset of the video using the selected at least one machine learning model to generate an enhanced video; and
outputting, by the video enhancement service, the enhanced video.

2. The computer-implemented method of claim 1, the request further including one or more of an indication of a desired quality of the enhanced video, an indication of bandwidth between the provider network and the requesting device, information about characteristics of a camera that recorded the video, information about a scene-type of the video, information about characteristics of the requesting device, or a selection of the ML model to be used to enhance the proper subset of the video.

3. The computer-implemented method of claim 2, the information about the requesting device comprising one or more of processing power, available memory, screen resolution, or screen refresh rate.

4. The computer-implemented method of claim 1, wherein the request is an application programming interface (API) call to retrieve media content, and the API call includes an indication of a stream name for retrieving the video.

5. The computer-implemented method of claim 4, the API call further including an indication of a starting chunk for retrieving the video.

6. The computer-implemented method of claim 1, wherein the request is an API call to retrieve media content, and the API call includes an indication of a time range of a requested fragment for retrieving the video.

7. The computer-implemented method of claim 1, wherein automatically selecting the at least one ML model is based on one or more of a desired quality of the enhanced video, a bandwidth between the provider network and the requesting device, characteristics of the requesting device, information about a camera that recorded the video, or a scene type of the video.

8. The computer-implemented method of claim 1, further comprising the at least one ML model receiving as input at least one of a desired quality of the enhanced video, characteristics of the requesting device, or a bandwidth between the provider network and the requesting device.

9. The computer-implemented method of claim 1, further comprising ascertaining bandwidth between the provider network and the requesting device, wherein a resolution of the enhanced video output by the video enhancement service is dependent at least in part on the bandwidth.

10. The computer-implemented method of claim 1, wherein the at least one ML model is selected from at least one of a bandwidth-based model, a camera type-based model, a scene type-based model, a speed-based model, a content provider-based model, a motion-based model, or an edge device capability-based model.

11. A system comprising:
video storage storing a video; and
a video enhancement service implemented by one or more electronic devices in a provider network, the video enhancement service including at least one processor and memory storing instructions that, when executed by the at least one processor, cause the video enhancement service to:
receive, from a requesting device, a request to provide the video, the request including an indication that at least a proper subset of the video is to be enhanced using at least one machine learning model;
automatically select at least one machine learning (ML) model to be used to enhance the proper subset of the video based on at least one factor;
enhance at least the proper subset of the video using the selected at least one machine learning model to generate an enhanced video; and
output the enhanced video.

12. The system of claim 11, the request further including one or more of an indication of a desired quality of the enhanced video, an indication of bandwidth between the provider network and the requesting device, information about characteristics of a camera that recorded the video, information about a scene-type of the video, information about characteristics of the requesting device, or a selection of the ML model to be used to enhance the proper subset of the video.

13. The system of claim 12, the information about the requesting device comprising one or more of processing power, available memory, screen resolution, or screen refresh rate.

14. The system of claim 11, wherein the request is an application programming interface (API) call to retrieve media content, and the API call includes an indication of a stream name for retrieving the video.

15. The system of claim 14, the API call further including an indication of a starting chunk for retrieving the video.

16. The system of claim 11, wherein the request is an API call to retrieve media content, and the API call includes an indication of a time range of a requested fragment for retrieving the video.

17. The system of claim 11, wherein automatically selecting the at least one ML model is based on one or more of a desired quality of the enhanced video, a bandwidth between the provider network and the requesting device, characteristics of the requesting device, information about a camera that recorded the video, or a scene type of the video.

18. The system of claim 11, the memory storing further instructions that, when executed by the at least one processor, further cause the at least one ML model to receive as input at least one of a desired quality of the enhanced video, characteristics of the requesting device, or a bandwidth between the provider network and the requesting device.

19. The system of claim 11, the memory storing further instructions that, when executed by the at least one processor, further cause the video enhancement service to ascertain bandwidth between the provider network and the requesting device, wherein a resolution of the enhanced video output by the video enhancement service is dependent at least in part on the bandwidth.

20. The system of claim 11, wherein the at least one ML model is selected from at least one of a bandwidth-based model, a camera type-based model, a scene type-based model, a speed-based model, a content provider-based model, a motion-based model, or an edge device capability-based model.

* * * * *